(12) United States Patent
Haile et al.

(10) Patent No.: US 11,437,008 B2
(45) Date of Patent: Sep. 6, 2022

(54) ACOUSTIC BARRIER CAPS IN ACOUSTIC HONEYCOMB

(71) Applicant: Hexcel Corporation, Dublin, CA (US)

(72) Inventors: Merid Minasse Haile, Phoenix, AZ (US); Lisa Diane Bowen, Arizona City, AZ (US); Clark Russell Smith, Phoenix, AZ (US)

(73) Assignee: HEXCEL CORPORATION, Dublin, CA (US)

( * ) Notice: Subject to any disclaimer, the term of this patent is extended or adjusted under 35 U.S.C. 154(b) by 541 days.

(21) Appl. No.: 16/681,149

(22) Filed: Nov. 12, 2019

(65) Prior Publication Data

US 2021/0142774 A1    May 13, 2021

(51) Int. Cl.

| | |
|---|---|
| *G10K 11/162* | (2006.01) |
| *B32B 3/12* | (2006.01) |
| *B32B 7/12* | (2006.01) |
| *B32B 27/06* | (2006.01) |
| *B32B 37/12* | (2006.01) |

(52) U.S. Cl.
CPC ............. *G10K 11/162* (2013.01); *B32B 3/12* (2013.01); *B32B 7/12* (2013.01); *B32B 27/06* (2013.01); *B32B 37/12* (2013.01); *B32B 2307/102* (2013.01); *B32B 2605/18* (2013.01)

(58) Field of Classification Search
CPC ........... G10K 11/162; B32B 3/12; B32B 7/12; B32B 27/06; B32B 37/12; B32B 2307/102; B32B 2605/18
See application file for complete search history.

(56) References Cited

U.S. PATENT DOCUMENTS

| | | |
|---|---|---|
| 7,434,659 B2 | 10/2008 | Ayle |
| 7,510,052 B2 | 3/2009 | Ayle |
| 7,854,298 B2 | 12/2010 | Ayle |
| 8,066,098 B2 | 11/2011 | Ayle |
| 8,413,761 B2 | 4/2013 | Ayle |
| 8,607,924 B2 | 12/2013 | Ichihashi |
| 8,651,233 B2 | 2/2014 | Ayle |
| 8,857,566 B2 | 10/2014 | Ayle |
| 9,016,430 B2 | 4/2015 | Ichihashi |
| 9,334,059 B1 | 5/2016 | Jones et al. |
| 9,469,985 B1 | 10/2016 | Ichihashi |
| 2019/0024589 A1 | 1/2019 | Bowen et al. |

FOREIGN PATENT DOCUMENTS

EP    2788601 B1    3/2019

*Primary Examiner* — Forrest M Phillips
(74) *Attorney, Agent, or Firm* — W. Mark Bielawski

(57) ABSTRACT

Acoustic honeycomb structures that include cells in which a friction-locking insertion process is used to locate acoustic barriers within honeycomb cells to provide multiple degree of freedom (MDOF) acoustic liners having a variety of acoustic resonator depths. Solid polymer films are formed into acoustic barrier caps. The acoustic barrier caps are friction-locked and bonded to cell walls at one or more cell depths to form acoustically reflective hard walls that form effective bottom ends for acoustic resonators.

20 Claims, 6 Drawing Sheets

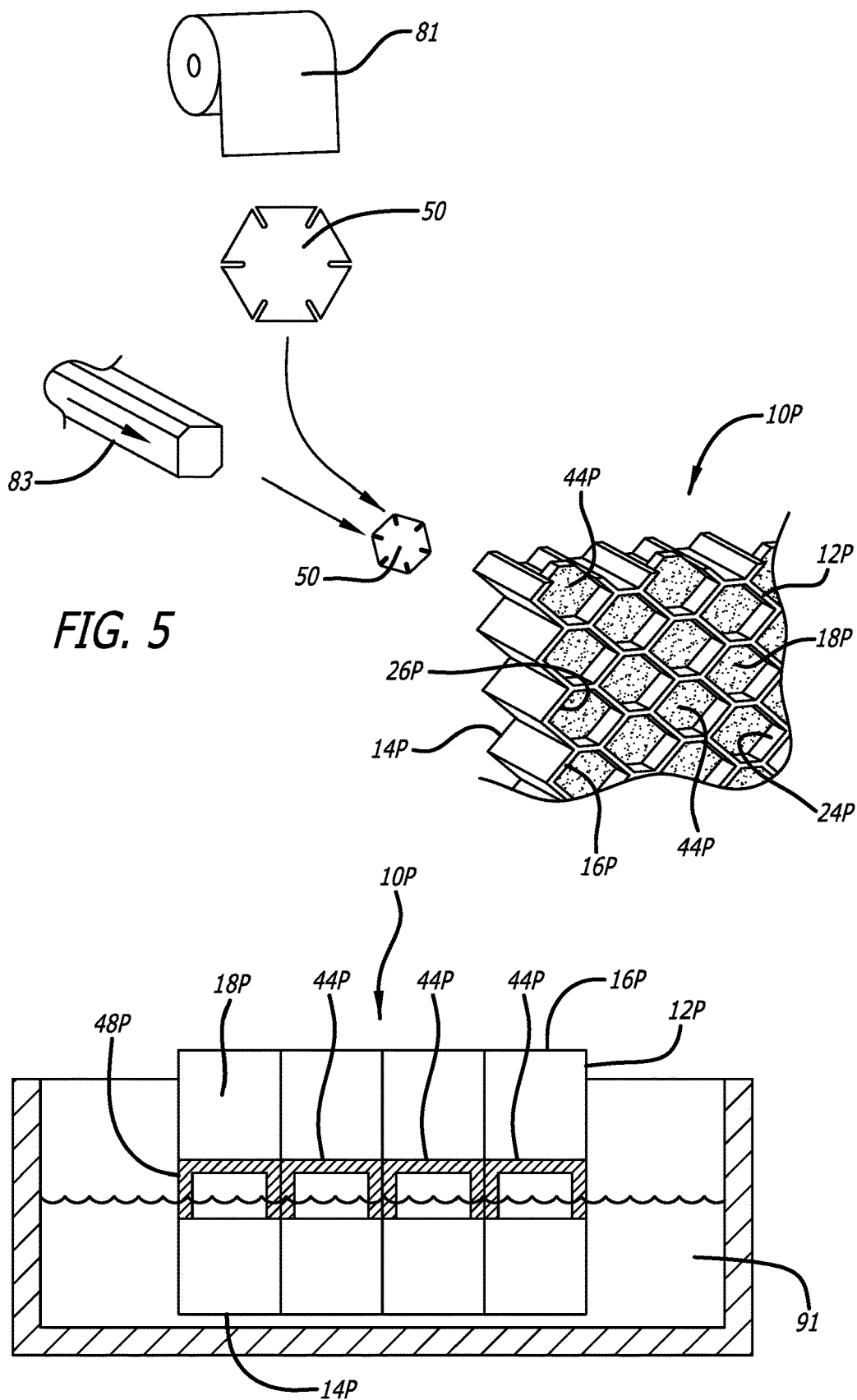

ACOUSTIC BARRIER CAPS IN ACOUSTIC HONEYCOMB

BACKGROUND OF THE INVENTION

1. Field of the Invention

The present invention relates generally to acoustic systems that are used to attenuate noise. The invention involves using honeycomb to make nacelles and other structures that are useful in reducing the noise generated by aircraft engines or other noise sources. More particularly, the invention is directed to acoustic structures in which acoustically reflective solid barriers are inserted into one or more of the honeycomb cells to provide an internal termination of the acoustic cell that determines the acoustic depth of the cell.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine nacelle including, inlet ducts, bypass ducts and exhaust structures. These acoustic treatments include acoustic liners that contain relatively thin acoustic materials or grids that have millions of holes that create acoustic impedance to the sound energy generated by the engine.

Honeycomb has been a popular material for use in aircraft and aerospace vehicles because it is relatively strong and lightweight. For acoustic applications, such as engine nacelles, acoustic materials are added to the honeycomb structure so that the honeycomb cells are acoustically closed at the end located away from the engine and covered with an acoustically permeable covering at the end located closest to the engine. The closed honeycomb cells create acoustic resonators that provides attenuation, damping and/or suppression of the noise. The particular frequencies of noise that are attenuated by a given honeycomb cell or resonator is directly related to the depth of the cell. In general, as the frequency of the noise decreases, the depth of the cell must be increased in order to provide adequate damping or suppression.

A typical acoustic liner has a honeycomb core that is sandwiched between a solid face sheet or skin and a perforated or otherwise sound permeable face sheet or skin. The perforated face sheet is located closest to the noise source and the solid face sheet forms the bottom of the acoustic resonator. In this type of acoustic liner all of the honeycomb cells have the same depth. Such acoustic liners, in which all the acoustic resonator depths are the same, are referred to as single degree of freedom (SDOF) acoustic liners. SDOF liners only provide sound damping around a specific sound frequency.

A basic problem facing acoustic engineers who design acoustic liners for jet engines is to make acoustic structures that provide adequate suppression or damping of the sound wave frequencies over the entire range of noise generated by the jet engine. Multiple SDOF acoustic liners having different resonator depths may be combined to attenuate noise over a broader range of frequencies. However, acoustic liners have been developed in which the effective resonator depths within a single liner are varied. Such multiple resonator depth acoustic liners are referred to as multiple degree of freedom (MDOF) acoustic liners. MDOF acoustic liners have been found to be effective in damping jet engine noise over a much broader frequency range than is possible using an SDOF acoustic liner.

One way to make an MDOF acoustic liner is to locate individual solid inserts within the honeycomb cells. The solid inserts are located at different distances between the honeycomb edges to provide an acoustic barrier which forms the bottom of the acoustic resonator. For example, see U.S. Pat. No. 8,651,233, in which solid inserts are positioned at various locations in honeycomb cells to provide an MDOF acoustic liner having multiple resonator cavity depths that are well-suited for damping a relatively wide range of sound frequencies.

The solid inserts used to form the acoustic resonator bottom must be sufficiently stiff to function as an acoustic barrier or hard wall that reflects substantially all the sound waves over the range of frequencies being attenuated or damped. The solid inserts must also be capable of withstanding the high temperatures to which jet engine acoustic liners are exposed. The solid inserts should be as light weight as possible while still providing desired sound wave reflectance.

Acoustic septi have been located within the interior of the honeycomb cells in order to provide the resonator with additional noise attenuation properties. Each acoustic septum is typically composed of a thin polymer fabric or perforated polymer film. The acoustic septum does not act as an acoustic barrier or hard wall. Instead, the acoustic septum provides attenuation or damping of sound waves that pass through the septum. One approach for locating acoustic septi in honeycomb cells involves inserting individual pieces of light-weight septum fabric into the honeycomb cell to form a septum cap which has anchoring flanges that are glued to the honeycomb walls. The use of septum caps is described in U.S. Pat. Nos. 7,434,659; 7,510,052; 7,854,298; 8,066,098; 8,607,924; 8,651,233; 8,857,566; 9,016,430 and 9,469,985.

Another approach to locating acoustic septi in honeycomb cells involves inserting individual pieces of solid polymer film into the honeycomb cell to form a septum cap which also has anchoring flanges that are glued to the honeycomb walls. The solid polymer film is perforated to form an acoustic septum either before or after the polymer film is inserted into the honeycomb cell. For example, see U.S. Pat. No. 8,413,761.

The process of locating a septum cap in a honeycomb cell requires that the septum cap be friction-locked within the cell to hold it in place prior to permanent bonding to the honeycomb wall. Friction-locking of the septum caps is an important aspect of this type of septum-insertion procedure. The septum caps may shift or otherwise move during handling if friction-locking is not adequate. Any shifting of the septum caps makes it difficult to apply adhesive uniformly to the septum caps during bonding. Shifting of the septum caps also causes uncontrolled altering of the acoustic properties. In the worst-case scenario, the septum caps may fall completely out of the honeycomb cell if friction locking is not adequate.

SUMMARY OF THE INVENTION

In accordance with the present invention, it was discovered that the friction-locking insertion process that has been used to locate acoustic septi within honeycomb cells can also be used to locate acoustic barriers within honeycomb cells to provide MDOF acoustic liners having a variety of acoustic resonator depths. The invention is based on the discovery that certain solid polymer films having certain thicknesses and shapes can be formed into acoustic barrier caps. The acoustic barrier caps can be friction-locked and bonded to cell walls to form acoustically reflective hard walls that form effective bottom ends for acoustic resonators.

The present invention is directed to acoustic structures that are designed to be located near a source of noise, such as a jet engine or other power plant. The structures include a honeycomb having a first edge to be located closest to noise source and a second edge. The honeycomb includes multiple cells that each have a left side and a right side. Each cell is formed by a lower wall that extends between the first and second edges of the honeycomb and an upper wall that also extends between said first and second edges of the honeycomb. The lower wall includes a lower left end portion, a lower right end portion and a lower central portion. The upper wall includes an upper left end portion, an upper right end portion and an upper central portion. A left junction along the left side of the cell is formed where the lower wall and upper wall meet. A right junction along the right side of the cell is formed where the lower wall and the upper wall meet. The depth of the cell is equal to the distance between the first and second edges of the honeycomb.

As a feature of the invention, an acoustic barrier cap is inserted into at least one of the cells to provide an acoustically reflective hard wall that forms the acoustic bottom of the cell. The acoustic barrier cap is a solid polymer film that has been folded to form a planar acoustic barrier portion and a tab portion surrounding the acoustic barrier portion. The planar acoustic barrier portion extends transverse to the upper and lower walls of the honeycomb. The planar acoustic barrier portion has a top side located nearest to the first edge of the honeycomb and a bottom side located nearest to the second edge of the honeycomb. The planar acoustic barrier portion is surrounded by a boundary that is composed of an upper right boundary portion, an upper central boundary portion, an upper left boundary portion, a lower right boundary portion, a lower central boundary portion and a lower left boundary portion.

As a further feature or the invention, the tab portion of the acoustic barrier cap includes an upper right tab, upper central tab and upper left tab that all protrude from the upper boundary of the planar acoustic barrier portion. The tab portion further includes a lower right tab, a lower central tab and a lower left tab that all protrude from the lower boundary of the planar acoustic barrier portion.

The acoustic barrier cap is inserted into the cell such that the upper right tab is friction locked to the upper wall at the upper right end portion, the upper central tab is friction locked to the upper wall at the upper central portion and the upper left tab is friction locked to the upper wall at the upper left end portion. The lower right tab is friction locked to the lower wall at the lower right end portion, the lower central tab is friction locked to the lower wall at the lower central portion and the lower left tab is friction locked to the lower wall at the lower left end portion.

The present invention is directed to the precursor structures that are formed when the acoustic barrier cap is friction-locked within the honeycomb cell. The present invention is also directed to the acoustic structures formed when the acoustic barrier caps are permanently bonded into the honeycomb as well as the methods for making the precursor and final acoustic structures.

The above discussed and many other featured and attendant advantages of the present invention will become better understood by reference to the following detailed description when taken in conjunction with the accompanying drawings.

BRIEF DESCRIPTION OF THE DRAWINGS

FIG. 5 is a first exemplary acoustic barrier cap for insertion into a hexagonal honeycomb cell.

FIG. 6 is a second exemplary acoustic barrier cap for insertion into a hexagonal honeycomb cell.

DETAILED DESCRIPTION OF THE INVENTION

Figure 1:
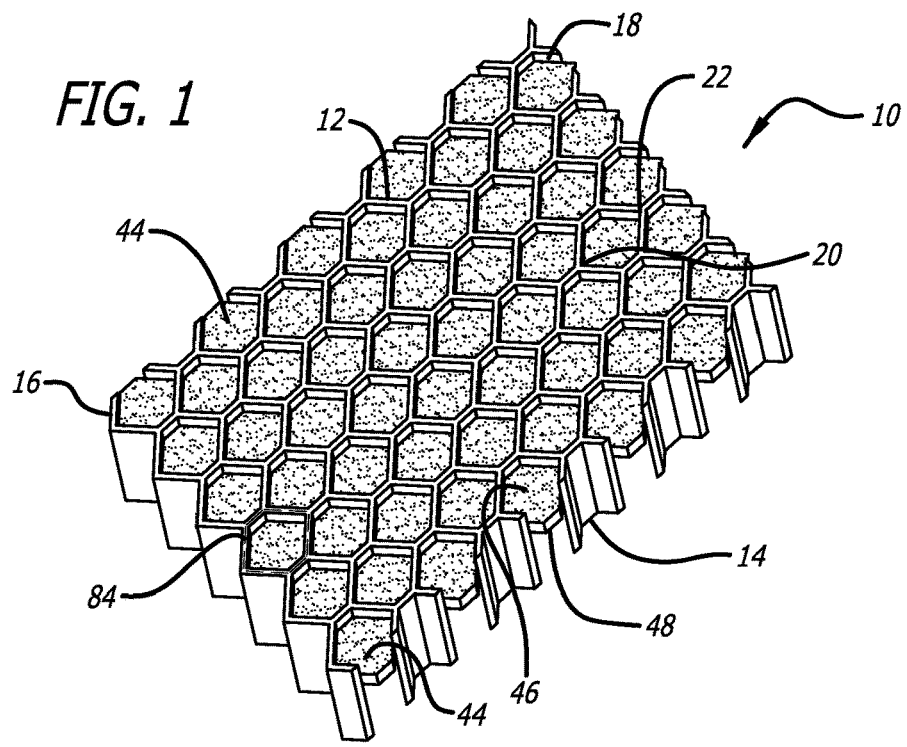
FIG. 1 is a perspective view of an exemplary acoustic structure in accordance with the present invention.
Figure 2:
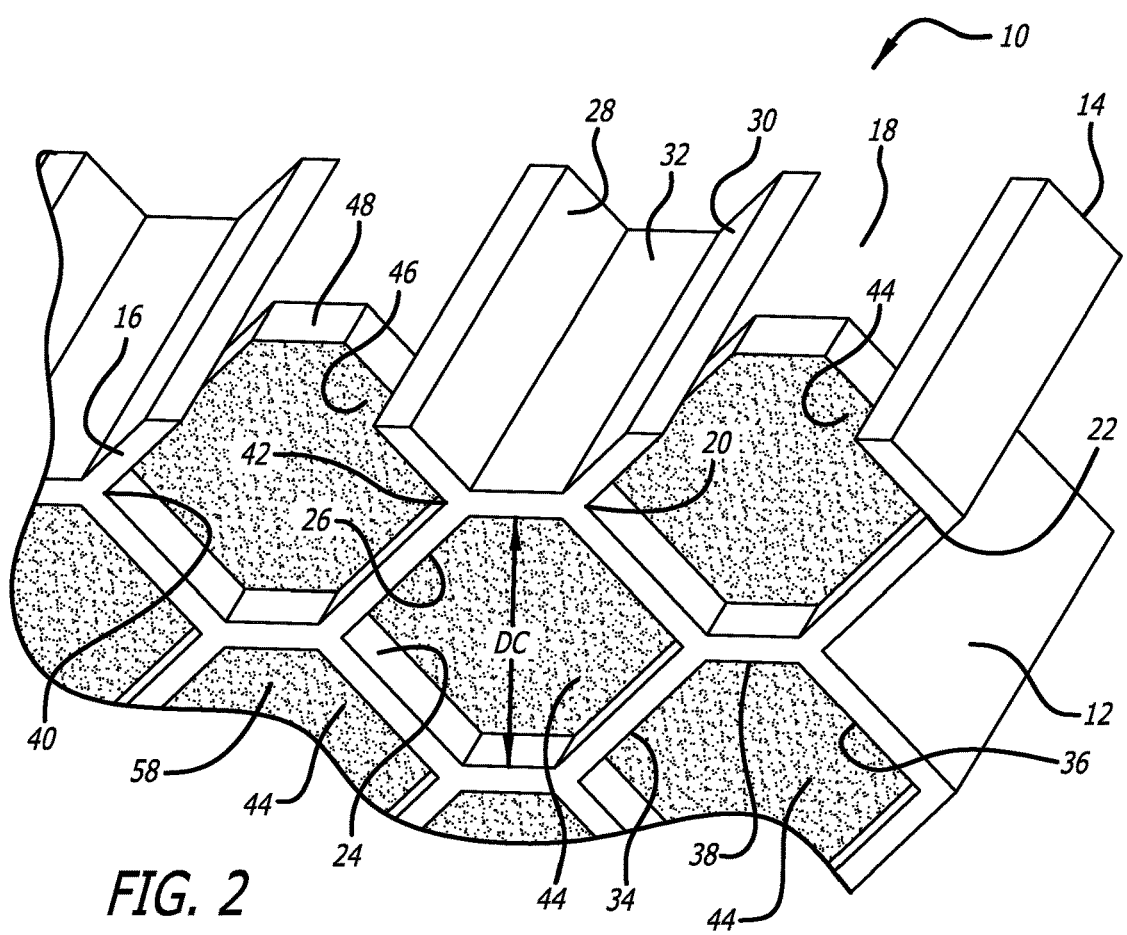
FIG. 2 is a magnified view a portion of the exemplary acoustic structure shown in FIG. 1.
Figure 7:
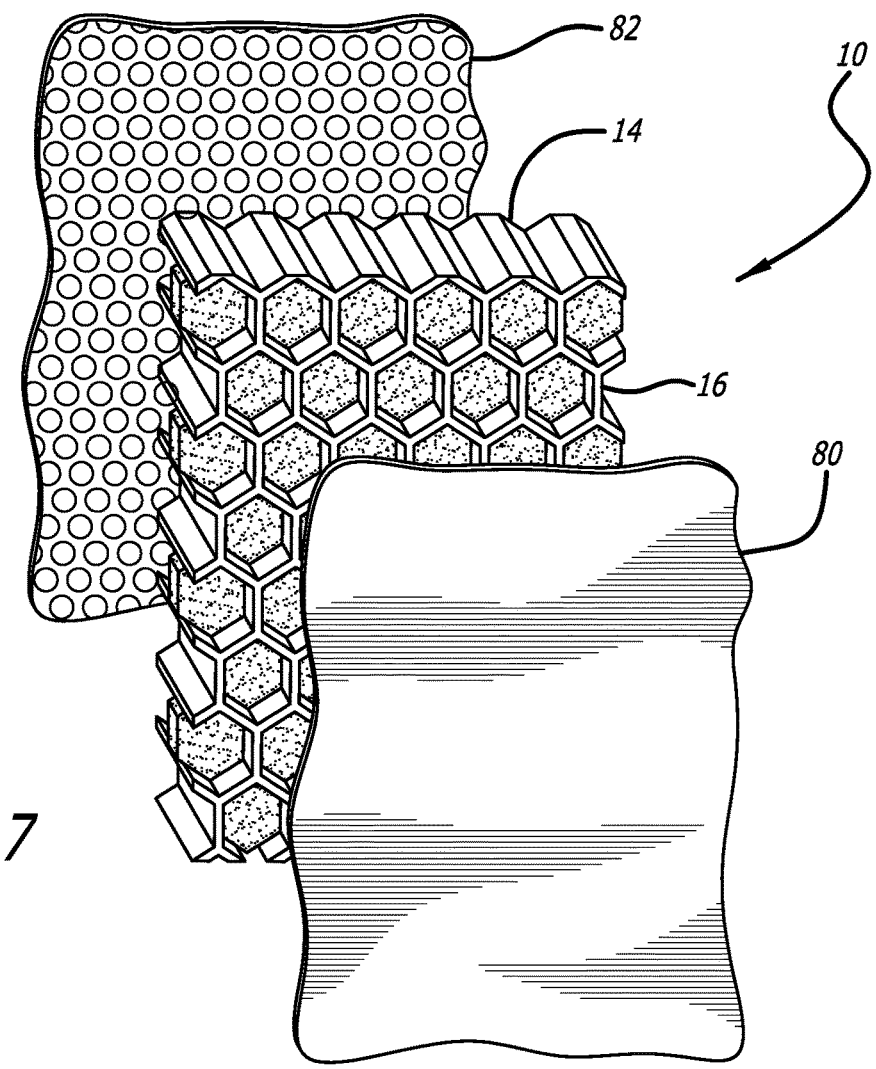
FIG. 7 is an exploded view of an exemplary acoustic liner.

An exemplary acoustic structure in accordance with the present invention is shown generally at 10 in FIGS. 1, 2 and 7. The acoustic structure 10 includes a honeycomb 12 having a first edge 14 which is to be located nearest the noise source and a second edge 16. The honeycomb 10 includes cells 18. Each cell 18 has a left side 20 and a right side 22. A lower wall 24 and upper wall 26 each extends between the first edge 14 and second edge 16 to define each cell 18. The lower and upper walls 24 and 26 preferably extend parallel to each other between the first edge 14 and second edge 16. The lower wall 24 includes a lower left end portion 28, a lower right end portion 30 and a lower central portion 32. The upper wall 26 includes an upper left end portion 34, a lower right end portion 36 and an upper central portion 38. A left junction 40 is formed at the left side of each cell where the lower left end portion 28 and upper left end portion 34 meet. A right junction 42 is formed at the right side of each cell where the lower right end portion 30 and upper right end portion 36 meet.

Each of the cells 18 has a depth (also referred to as the core thickness) that is equal to and defined by the distance between the first edge 14 and second edge 16. Each cell 18 has a cell size that is equal to the area surrounded by the lower wall 24 and upper wall 26, as measured at the first edge 14 of the cell and as measured perpendicular to the cell walls.

The acoustic structure 10 includes acoustic barrier caps 44. Each acoustic barrier cap 44 is a piece of solid polymer film that has been folded to form a planar acoustic barrier portion 46 and a tab portion 48 surrounding the planar acoustic barrier portion 46. The acoustic barrier cap 44 is located within the cell 18 between the first edge 14 and second edge 16 to provide an acoustic cavity that has a depth which is less than the depth of the cell 18. The acoustic cavity depth is the distance between the planar acoustic barrier portion 46 and the first edge 14. The planar acoustic barrier portion 46 is oriented transverse to the cell walls. It is preferred that the planar acoustic barrier portion 46 is oriented substantially perpendicular to the cell walls. Substantially perpendicular means at an angle of 90°±10°.

Figure 3:
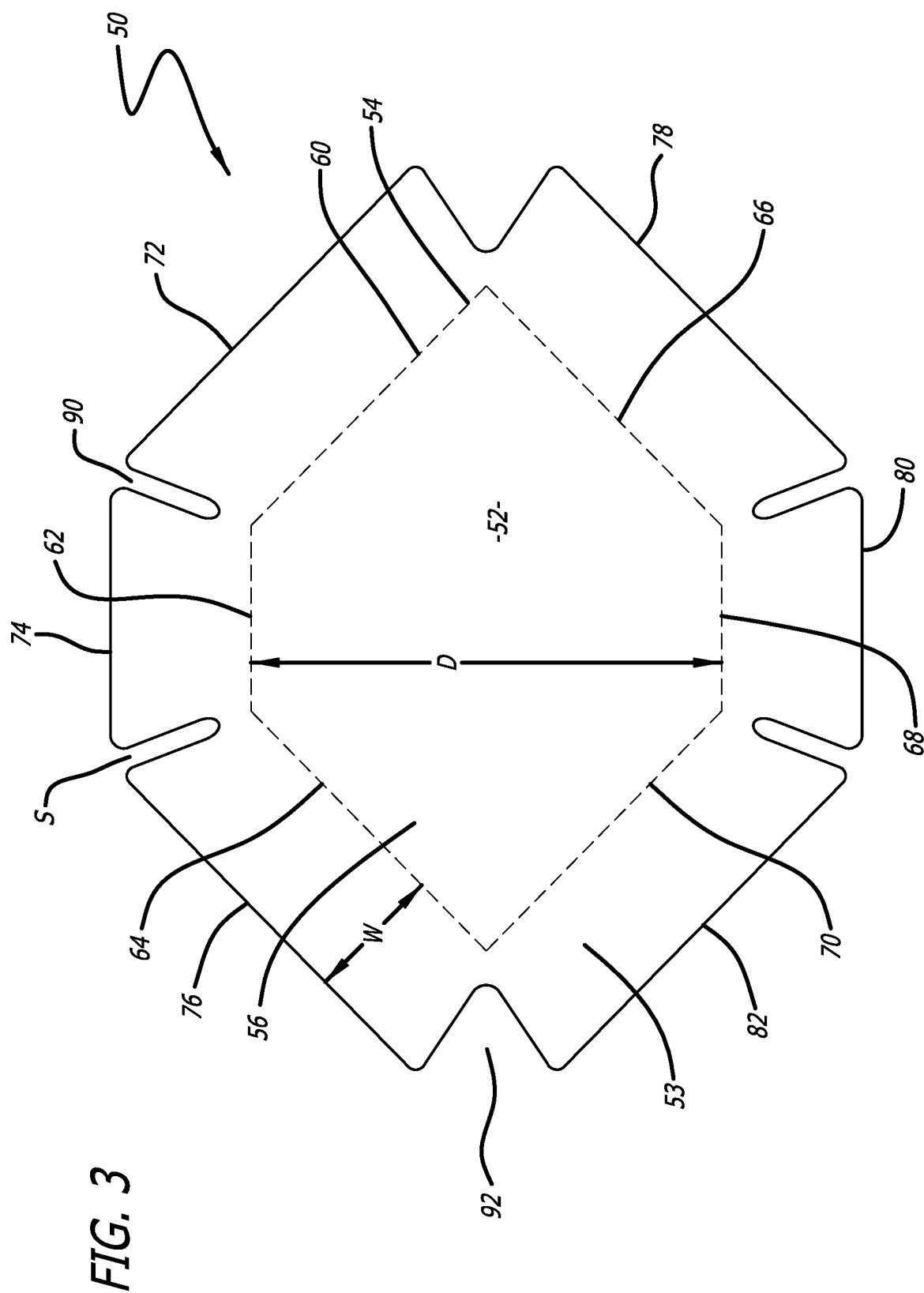
FIG. 3 is a simplified view demonstrating insertion of the acoustic barrier cap into the cells of a honeycomb to form a precursor structure where the septums are friction-locked within the cells

An exemplary polymer film insert is shown in FIG. 3 at 50 prior to the insert being folded and inserted into a cell 18 to form an acoustic barrier cap 44. The insert 50 includes a planar acoustic barrier portion 52 and a tab portion 53 surrounding the planar acoustic barrier portion 52. The planar acoustic barrier portion has a boundary 54 (shown in phantom). The boundary 54 has an upper right boundary portion 60, an upper central boundary portion 62, an upper left boundary portion 64, a lower right boundary portion 66, a lower central boundary portion 68 and a lower left boundary portion 70. The planar acoustic barrier portion 52 has a top side 56 that is located nearest to the first edge of the honeycomb when the insert 50 is placed in the honeycomb cell. The bottom side 58 of the insert is located nearest to the second edge of the honeycomb when the insert 50 is placed in the honeycomb cell (see FIG. 2). The tab portion 53 is folded toward the top side 56 of the planar acoustic barrier portion 54 during insertion into the honeycomb cell 18.

The tab portion 53 of the insert 50 includes: an upper right tab 72 protruding from the upper right boundary portion 60; an upper central tab 74 protruding from the upper central boundary portion 62; an upper left tab 76 protruding from the upper left boundary portion 64; a lower right tab 78 protruding from the lower right boundary portion 66; a lower central tab 80 protruding from the lower central boundary portion 68; and a lower left tab 82 protruding from the lower left boundary portion 70.

When the insert 50 is placed into a honeycomb cell 18 to form the acoustic barrier cap 44, the tabs are friction-locked to the cell walls as follows: the upper right tab 72 is friction locked to the upper wall 26 at the upper right end portion 36; the upper central tab 74 is friction locked to the upper wall 26 at said upper central portion 38; the upper left tab 76 is friction locked to the upper wall 26 at the upper left end portion 34; the lower right tab 78 is friction locked to the lower wall 24 at said lower right end portion 30; the lower central tab 82 is friction locked to the lower wall 24 at the lower central portion 32; and the lower left tab 82 is friction locked to the lower wall 24 at the lower left end portion 28.

The honeycomb 12 can be made from any of the conventional materials used in making honeycomb panels including metals, ceramics, and composite materials. Exemplary composite materials include fiberglass, resin impregnated aramid paper, such as Nomex®, and various combinations of graphite fibers with suitable matrix resins. Matrix resins that can withstand relatively high temperatures (350° F. to 500° F.) are preferred for use in acoustic panels for jet engines. Honeycomb made from metallic or ceramic material can operate at temperatures higher than honeycomb made with composite materials. However, composite honeycomb is preferred for jet engine acoustic panels because it is relatively light weight. Composite honeycomb is available commercially that is capable of extended service at temperatures of 350° F. to 500° F. with short-term capabilities up to 700° F. Such high temperature honeycomb utilizes a glass fabric fibrous support in combination with a high temperature resin, such as polyamideimide resin or polyimide resin, which is used for the prepreg resin matrix, node adhesive and coating resin. A preferred exemplary type of fiberglass reinforced hexagonal polyimide honeycomb is available from Hexcel Corporation (Casa Grande, Ariz.) under the tradename HexWeb® HRH-327.

The honeycomb cell 18 has a cell perimeter that is shown in phantom at 84 in FIG. 1. The cell perimeter 84 is defined by the upper wall 26 and said lower wall 24. The upper right end portion 36 and upper left end portion 34 each form a greater portion of the cell perimeter 84 than the upper central portion 38. The lower right end portion 30 and lower left end portion 28 form a greater portion of the cell perimeter 84 than the lower central portion 32. This type of irregular hexagonal shape is preferred.

The insert 50 is specifically designed for insertion into the irregular hexagon-shaped honeycomb cell 18. The upper right tab 72 and the upper left tab 76 are each larger than the upper central tab 74. The lower right tab 78 and the lower left tab 82 are each larger than the lower central tab 80. This tab configuration matches the respective walls to which the tabs are friction locked during insertion of the insert 50 into the cell. 18.

Acoustic barrier caps in accordance with the present invention may be inserted into cells that have shapes other than the irregular hexagon formed by cell 18 provided that the insert shape is altered to accommodate the different cell geometry. The cell shape may be a regular hexagon or other cell shape that is suitable for used in making an acoustic panel. For example, the acoustic honeycomb can be a flexible honeycomb where the cell walls form a combination of convex and concave curvatures that allow the honeycomb to be more easily formed into non-planar acoustic panels. A preferred flexible honeycomb is Flex-Core® flexible honeycomb which is available from Hexcel Corporation (Dublin, Calif.). Flex-Core® flexible honeycomb is made from a variety of suitable materials including 5052 or 5056 aluminum, aramid/phenolic composite and fiberglass/phenolic composite.

The present invention is applicable to cell sizes that range from 0.1 square inch to 1.0 square inch. Cell sizes below 0.1 square inch are too small to allow insertion of the acoustic barrier cap. Cell sizes above 1.0 square inch require films that are too thick to be folded and inserted into the cell. Cell size is the area surrounded by the upper wall 26 and the lower wall 24, as measured at the first edge 14. Preferred cell sizes range from 0.3 square inch to 0.6 square inch. Particularly preferred are honeycomb cells where the distance (DC) between opposing walls of the hexagonal cell are 0.38 inch±0.05 inch.

In order to provide a suitable acoustic barrier cap, the insert 50 must be of sufficient size, shape and flexibility so that it can be folded and inserted into the cell. The folded insert must also exhibit enough bounce back to provide adequate friction locking of the acoustic barrier cap within the honeycomb cell to allow subsequent handling including application of an adhesive to permanently bond the acoustic barrier cap within the cell. The insert 50 must also be made from a polymer that is able to withstand the high temperatures to which jet engine acoustic liners are typically exposed.

The planar acoustic barrier portion 52 of insert 50 must be sufficiently stiff so that the resulting acoustic barrier cap 44 functions as the bottom of an acoustic cavity and reflects a substantial portion of sound that enters the cell 18. The planar acoustic barrier portion 52, when formed into the planar acoustic barrier portion 46 of the acoustic barrier cap, must be sufficiently stiff to provide an acoustic reflection coefficient of at least 0.75 for sound wave frequencies ranging from 500 Hz to 4000 Hz. More preferably, the reflection coefficient of the acoustic barrier cap will be at least 0.8 for sound wave frequencies ranging from 500 Hz to 4000 Hz. The reflection coefficient is determined by the equation $R=(Z-1)/(Z+1)$ where R is the reflection coefficient and Z is the frequency dependent normalized impedance of the planar acoustic barrier portion A reflection coefficient of 1 is equal to reflection of 100% of the sound waves at a given frequency.

It was discovered that films of polyether ether ketone (PEEK), which previously have been used to make perforated acoustic septum caps (See U.S. Pat. No. 8,413,761), may also be used to make suitable acoustic barrier caps provided that the above criteria with respect to size, shape, bounce back (friction locking), insertion flexibility and acoustic stiffness are met.

PEEK is a crystalline thermoplastic polymer that can be processed to form films that are either in the amorphous or crystalline phase. Compared to the crystalline PEEK films, amorphous PEEK films are more transparent and easier to thermoform. Crystalline PEEK films are formed by heating amorphous PEEK films to temperatures above the glass transition temperature ($T_g$) of the amorphous PEEK for a sufficient time to achieve a degree of crystallinity on the order of 30% to 35%. Crystalline PEEK films have better chemical resistance and wear properties than the amorphous films. The crystalline PEEK films are also less flexible and have more bounce-back than the amorphous film. Bounce-back is the force or bias that a folded film exerts towards returning to its original pre-folded (flat) shape. Crystalline PEEK films are preferred for use in making acoustic barrier caps. Films of PEEK may be obtained from SEFAR America Inc. (Depew, N.Y.) under the trade names SEFAR PETEX, SEFAR NITEX and SEFAR PEEKTEX. Sheets or films of PEEK are also available commercially from Victrex USA (Greenville, S.C.) which produces films of PEEK under the tradename VICTREX® PEEK™ polymer.

Polymer films other than PEEK film may be used provided that they exhibit similar properties with respect to bounce back (friction locking), insertion flexibility, acoustic stiffness, and thermal stability. For example, polyimide films are an alternative to PEEK films for use in making acoustic barrier caps. A variety of suitable polyimide films are available from DuPont Chemical Company (Midland, Mich.) under the trade name KAPTON® polyimide films. Films made from polyether ketone or polyphenylene sulfide are also suitable.

The thickness of the polymer film used to make inserts should be from 0.003 to 0.035 inch with the thickness of the polymer film increasing as the cell size increases from 0.1 square inch to 1.0 square inch. The preferred polymer film thickness is from 0.010 to 0.025 inch for cells 18 where the cell size is from 0.4 to 0.5 inch. It was found that this preferred film thickness provides a particularly useful combination of insert foldability, friction locking of the acoustic barrier cap and high acoustic reflection coefficient. Insert 50 preferably has a polymer film thickness of from 0.003 to 0.009 inch. Such inserts are preferably used to make acoustic barrier caps that are inserted into hexagonal honeycomb with cell sizes of from 0.1 to 0.6 square inch.

Figure 4:
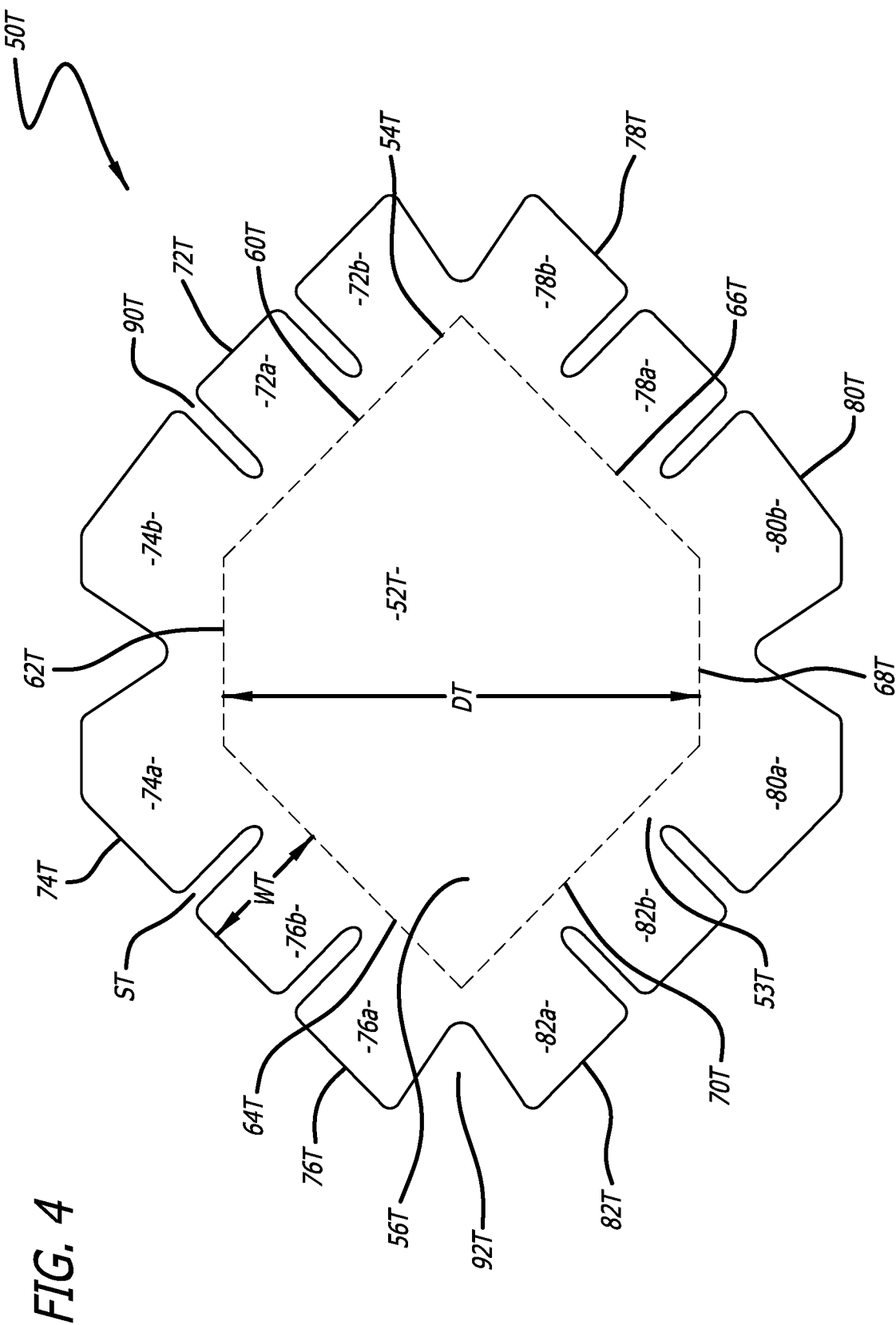
FIG. 4 is a simplified view demonstrating an exemplary method for applying adhesive to the tab portion of the acoustic barrier cap.

For hexagonal honeycomb cell sizes of 0.4 to 1.0 inch, it is preferred that the insert be from 0.010 to 0.035 inch thick. Such a thicker insert is shown at 50T in FIG. 4. Insert 50T has the same basic shape as insert 50 (FIG. 3), except that the tabs are slotted to form sub-tabs which make the thicker insert more flexible. The sub-tab portions ensure that thicker insert 50T has the flexibility and bounce back required for it to be inserted and friction-locked within the cell.

The reference numbers used to identify the various elements of insert 50T correspond to the numbers used to identify the elements of insert 50. A "T" has been added to corresponding numbers in FIG. 4 to reflect that they are the same elements as described for insert 50, except that insert 50T is thicker. Accordingly, the previous description of the various numbered elements with respect to insert 50 also apply to the corresponding number (T) elements set forth in FIG. 4. The tab portion 53T of insert 50T includes additional slots that divide each of the tabs 72T, 74T, 76T, 78T, 80T and 82T into a first sub-tab portion and second sub-tab portion. The sub-tab portions are identified in FIG. 4 using the tab number followed by an "a" or "b" to identify the individual sub-tab portions.

The size and shape of the planar acoustic barrier portion 52 (52T) will be the same or slightly less than the cell size and shape. Preferably, the distance D (DT) between the opposing upper boundary portion 62 (62T) and lower central boundary portion 68 (68T) will be from 85 to 99% of the corresponding distance between the opposing upper central wall portion 38 and lower central wall portion 32. The slots in the insert S (ST) that separate the tabs from each other should terminate at or close to the boundary of the planar acoustic portion 54 (54T). The slots should terminate at a distance from the boundary 54 (54T) that is equal to from 0 to 50% of the tab width W (WT). Preferably, the slots should terminate at a distance from the boundary 54 (54T) that is equal to from 2 to 20% of the tab width.

The width W (WT) of the tab portion 53 (53T) may be varied depending upon a number of factors including the cell size, the flexibility (thickness) of the polymer film, the number of tabs in the tab portion, and the adhesive used to permanently bond the acoustic barrier cap to the cell wall. Tab portion widths on the order of 0.1 inch to 0.5 inch are suitable. Preferably, the tab portion width W (WT) will be from 5 to 35% of the distance between the opposing upper and lower central boundary portions D (DT).

The slots S (ST) that separate the tabs from each other may be U-shaped, as shown at 90 and 90T, or V-shaped as shown 92 and 92T. It is preferred that the upper left tab 76 (76T) and lower left tab 82 (82T) are separated from each other by a V-shaped slot and that the upper right tab 72 (72T) and lower right tab 78 (78T) are also separated from each other by a V-shaped slot. The V-shaped slots at these locations were found to be effective in promoting suitable folding and friction locking of the film inserts in the honeycomb cell.

Inserts having the combination of U-shaped and V-shaped slots shown in FIG. 3 were made from crystalline PEEK film that was 0.006 inch thick. The inserts were used to form acoustic barrier caps in HexWeb® HRH-327 honeycomb with cells having a DC of 0.38 inch. The acoustic barrier caps exhibited a reflection coefficient of about 0.8 for sound wave frequencies ranging from 500 Hz to 2000 Hz and 3500 Hz to 4000 Hz. Inserts having the combination of U-shaped and V-shaped slots shown in FIG. 4 were made from crystalline PEEK film that was 0.010 inch thick. The inserts were used to form acoustic barrier caps in HexWeb® HRH-327 honeycomb with cells having a DC of 0.38 inch. The acoustic barrier caps exhibited a reflection coefficient that increased from 0.8 at 500 Hz to 0.9 over the entire range from 500 Hz to 4000 Hz. The thicker inserts (0.010 inch) are particularly preferred because they provide a relatively high reflection coefficient over a wider frequency range as compared to the thinner inserts (0.006 inch). This increase in reflection coefficient properties is unexpected in view of the relatively small (0.004 inch) increase in PEEK film thickness.

The tab portion of the insert may be perforated to increase the surface area of the tab portion to enhance adhesive bonding to the cell walls. The perforations provide added surface area and openings where adhesive can enter to improve the bonding of the tab portion to the cell walls. The perforations or holes may be drilled mechanically or using chemicals. It is preferred that the perforations be made by laser drilling holes through the relatively thin polymer film. It is preferred that the polymer film is laser drilled to provide the desired number of perforations prior to forming the insert into an acoustic barrier cap. An advantage of this procedure is that the flat insert surface makes it easier to keep the laser beam focused on the polymer film during the drilling operation.

An exemplary method for inserting acoustic barrier caps into honeycomb cells to form a precursor structure where the acoustic barrier caps are friction-locked within the honeycomb cells is shown in FIG. 5. The reference numbers used to identify the honeycomb structure in FIG. 5 are the same as in FIG. 1, except that they include a "P" to indicate that the structure is a precursor structure wherein the acoustic barrier caps are not yet permanently bonded to the cell walls.

As shown in FIG. 5, the polymer film 81 is cut to form an appropriately sized insert, such as the insert 50 shown in FIG. 3. An appropriately sized plunger 83 is used to force the insert 50 into a honeycomb cell using the plunger 83. A cap-folding die (not shown) may be used to facilitate the insertion process. The cap-folding die has a die opening that is sized and shaped to pre-fold and form the acoustic barrier cap prior to entry into the honeycomb cell. The use of cap-folding die is preferred, but not required. It is possible to use the honeycomb as the die and form the acoustic barrier cap by simply forcing the insert 50 into the cell using plunger 83. The edges of many honeycomb panels tend to be relatively jagged because the panels are typically cut from a larger block of honeycomb during the fabrication process. Such jagged honeycomb edges tend to catch, tear and contaminate the acoustic barrier cap when a flat insert film is forcibly inserted directly into the cell. Accordingly, the honeycomb edges should be as smooth as possible if the honeycomb is to be used as the die for folding and forming the acoustic barrier cap.

It is important that the size, shape and flexibility of the polymer film and the size/shape of the plunger and die (or just the plunger if a die is not used) be chosen such that the acoustic barrier cap can be inserted into the cell without damaging the polymer film while at the same time providing enough frictional contact between the tab portion and the cell wall to hold the acoustic barrier cap in place during subsequent handling of the precursor structure. The amount of frictional locking or holding should be sufficient to keep the acoustic barrier caps from falling out of the honeycomb, even if the precursor structure is inadvertently dropped during handling.

Frictional-locking of the acoustic barrier cap to the cell walls is achieved by varying the tab portion size, number of tabs, polymer film thickness, polymer film stiffness/bounce-back, slot sizes and slot shapes until an adequate level of friction-locking is achieved. For example, friction-locking tends to decrease as the number of tabs and/or slot size is increased. Friction-locking tends to go up as the polymer film thickness, polymer film stiffness/bounce-back and tab size are increased. Specific combinations of these parameters, as set forth above for inserts 50 and 50T, were found to provide adequate friction locking of the acoustic barrier caps within the precursor honeycomb structure.

The degree of frictional locking of an acoustic barrier cap to the honeycomb cell walls can be measured by placing a test weight onto the acoustic barrier cap and determining if there is any resulting movement of the cap. For example, an acoustic barrier cap is considered to be frictionally locked to the honeycomb cell walls with an adequate friction locking force if it passes the following test. A test weight (27 grams) is placed on top of the dry acoustic barrier cap from the insert side. The friction locking force is adequate when the dry cap will support the 27 grams without sliding down the honeycomb cell. In an exemplary test, the 27 gram test weight is a steel rod that is 0.368 inch in diameter and 2.00 inches long.

The acoustic barrier caps 44P are only held in place in precursor structure 10P in FIG. 5 by frictional locking. As mentioned previously, the frictional locking must be sufficient to hold the septum caps securely in position until they can be permanently bonded using an appropriate adhesive. The adhesive that is used can be any of the conventional adhesives that are used in honeycomb panel fabrication. Preferred adhesives include those that are stable at high temperatures (350° to 500°). Exemplary adhesives include epoxies, acrylics, phenolics, cyanoacrylates, bismaleimides, polyamide-imides and polyimides.

The adhesive may be applied to the tab portion/cell wall interface using a variety of known adhesive application procedures. An important consideration is that the adhesive should be applied in a controlled manner. The adhesive, as a minimum, should be applied to the tab portion at the interface with the cell wall. An exemplary adhesive application procedure is shown in FIG. 6. In this exemplary procedure, the honeycomb 12P is simply dipped into a pool 91 of liquid adhesive so that only the tab portions 48P are immersed in the adhesive. The adhesive can be accurately applied to the tab portion/cell wall interface using this dipping procedure provided that the acoustic barrier caps are accurately friction-locked at the same level prior to dipping. For acoustic barrier caps located at different levels, multiple dipping steps are required. Alternatively, the adhesive could be applied using a brush or other site-specific application technique. Some of these techniques may be used to coat the core walls with the adhesive before the acoustic barrier cap is inserted. Alternatively, the adhesive may be screen printed onto the tab portion before insertion into the core The dipping procedure for applying the adhesive that is depicted in FIG. 6 is preferred because the adhesive tends to wick upward by capillary action into the interface between the tab portion and cell walls. This upward wicking of the adhesive fills any air gaps between the tab portion and cell walls to ensure that the acoustic barrier cap provides maximum sound wave reflection. Once the adhesive is in place, it is cured or otherwise set according to known procedures to permanently bond the acoustic barrier cap to the honeycomb cell walls.

Figure 10:
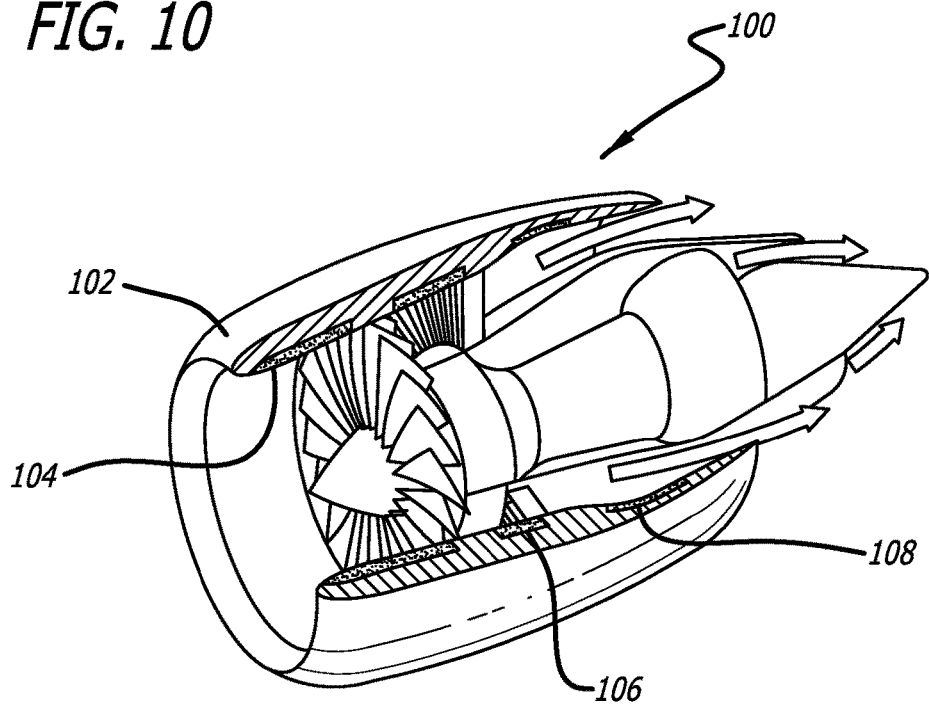
FIG. 10 is a simplified sectional view of a turbofan jet engine showing exemplary positions where acoustic liners are located.

The acoustic structures in accordance with the present invention may be used in a wide variety of situations where noise attenuation is required. The acoustic structures are well suited for use in connection with power plant systems where noise attenuation is usually an issue. Since honeycomb is a relatively lightweight material, the acoustic structures of the present invention are particularly well suited for use in aircraft systems. Exemplary uses include nacelles for jet engines, cowlings for large turbine or reciprocating engines and related acoustic structures. An exemplary turbofan jet engine is shown at 100 in FIG. 10. The jet engine 100 includes a nacelle 102. Acoustic panels or liners in accordance with the present invention may be placed, for example, at locations 104, 106 and 108, to provide damping or attenuation of the noise generated by the jet engine.

The basic acoustic structure of the present invention is typically heat-formed into the final shape of the engine nacelle and then the skins or sheets of outer material are bonded to the outside edges of the formed acoustic structure with an adhesive layer(s). This completed sandwich panel is cured in a holding tool, which maintains the complex shape of the nacelle during the bonding. For example, as shown in FIG. 7, the acoustic structure 10 is bonded on the second edge 16 to a solid sound-impermeable sheet or skin 80 and a sound-permeable perforated skin or sheet 82 is bonded to the first edge 14 to form an acoustic panel or acoustic liner. The bonding of the solid skin 80 and perforated skin 82 is typically accomplished on a bonding tool at elevated temperature and pressure. The bonding tool is generally required in order to maintain the desired shape of the acoustic structure during the panel formation process.

Figure 8:
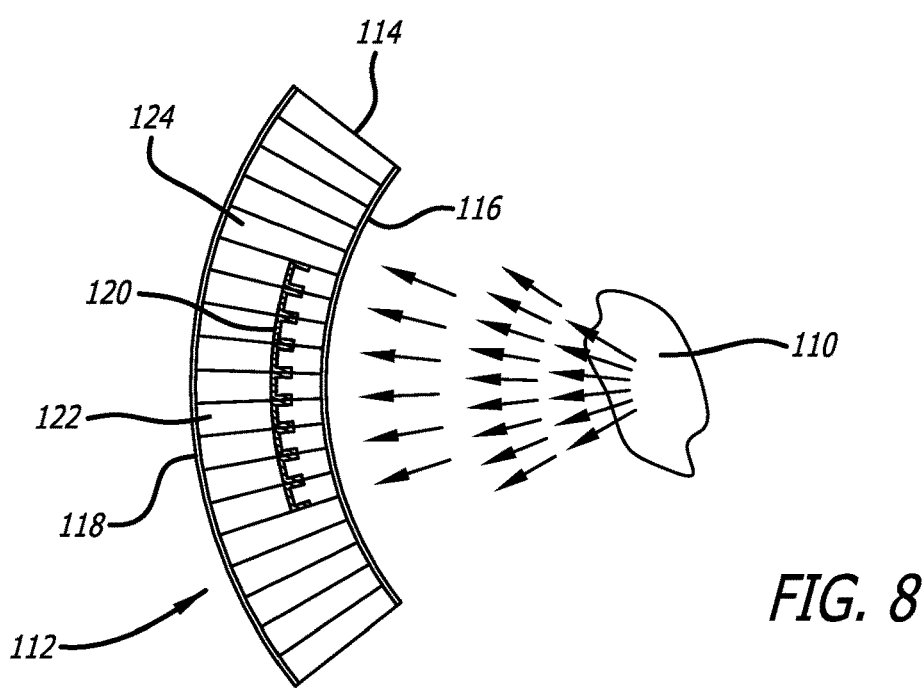
FIG. 8 depicts the exemplary acoustic liner located near a noise source.

In FIG. 8, a portion of an exemplary acoustic panel 112 is shown in position as part of a nacelle surrounding a jet engine or other noise source. The jet engine or other noise source is shown diagrammatically at 110. The acoustic panel 112 includes an acoustic structure 114, a sound permeable skin 116 and a solid sound impermeable skin 118. Acoustic barrier caps 120 are present in some of the honeycomb cells 122 to form acoustic resonators having depths equal to the distance from the sound permeable skin 116 to the planar acoustic portion of the acoustic barrier caps 120. Other honeycomb cells 124 do not include an acoustic barrier cap so that the effective resonator depth is equal to the distance from the sound permeable skin 116 to the solid skin 118. The acoustic panel 112 is an example of the type of MDOF acoustic liners that can be made in accordance with the present invention by using acoustic barrier caps to reduce the depths of some of the honeycomb cells.

Figure 9:
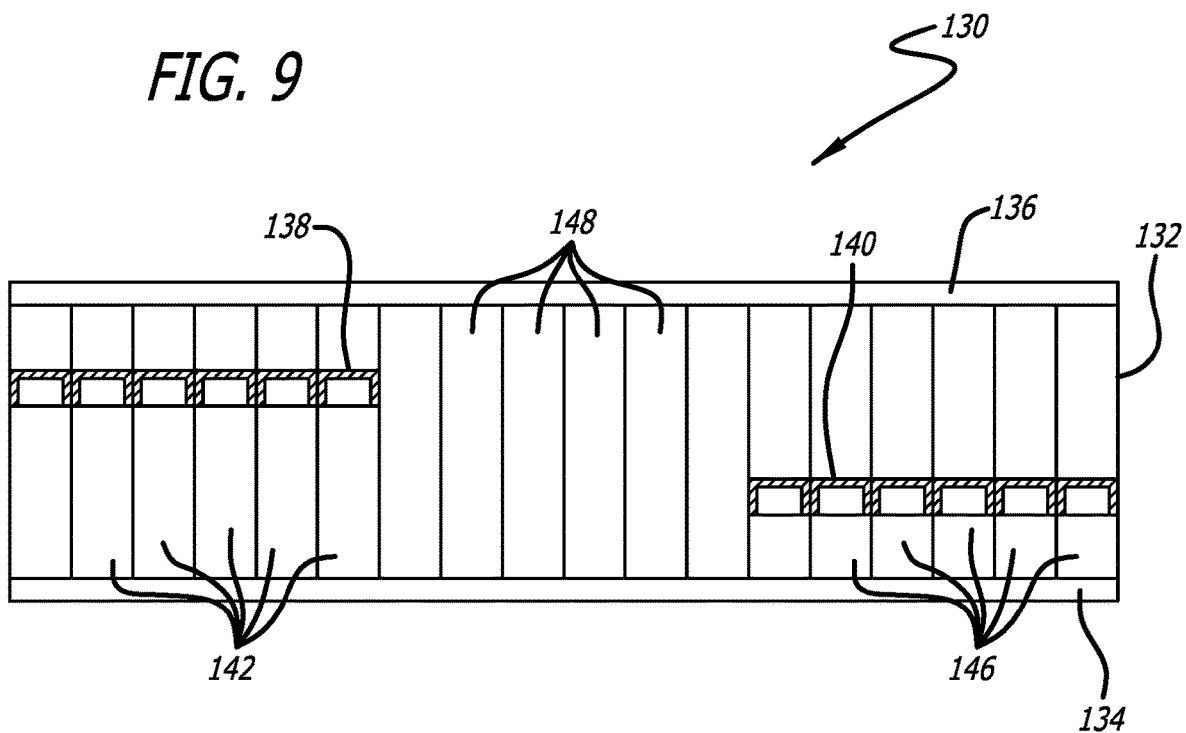
FIG. 9 is a simplified view showing the orientation in a honeycomb of an embodiment of the present invention where the acoustic barrier caps are located at different heights within the same honeycomb.

Another exemplary acoustic panel is shown at 130 in FIG. 9. The acoustic panel 130 includes an acoustic structure 132, a sound permeable skin 134 and a solid sound impermeable skin 136. Acoustic barrier caps 138 and 140 are located in cells 142 and 146, respectively, to provide resonator cavities having different depths. Cells 148 do not include acoustic barrier caps. This type of MDOF design, where multiple resonator depths are provided, allows fine-tuning of the noise attenuation properties of the acoustic structure. The multiple resonator depth configuration shown in FIG. 9 is intended only as an example of the wide variety of possible multi-level acoustic barrier cap arrangements that are possible in accordance with the present invention. As will be appreciated by those skilled in the art, the number of different possible acoustic barrier cap placement levels and variations are extremely large and can be tailored to meet specific noise attenuation requirements.

Having thus described exemplary embodiments of the present invention, it should be noted by those skilled in the art that the within disclosures are exemplary only and that various other alternatives, adaptations and modification may be made within the scope of the present invention. Accordingly, the present invention is not limited to the above preferred embodiments and examples but is only limited by the following claims.

What is claimed is:

1. An acoustic structure precursor in which an acoustic barrier cap is friction-locked within a cell of a honeycomb to form an acoustic cavity that attenuates noise generated from a source once said acoustic barrier cap is adhesively bonded within said cell to form an acoustic hard wall, said acoustic structure precursor comprising:

A) a honeycomb comprising a first edge to be located closest to said source and a second edge, said honeycomb comprising a cell having a left side and a right side, said cell being defined by a lower wall that extends between said first and second edges and an upper wall that also extends between said first and second edges, said lower wall comprising a lower left end portion, a lower right end portion and a lower central portion located between said lower left and lower right end portions, said upper wall comprising an upper left end portion, an upper right end portion and an upper central portion located between said upper left and upper right end portions, wherein a left junction along the left side of said cell is formed where said lower left end portion and said upper left end portion meet, wherein a right junction along the right side of said cell is formed where said lower right end portion and said upper right end portion meet, wherein said cell has a depth defined by the distance between said first and second edges and wherein said cell has a cell area defined by the area surrounded by said upper wall and said lower wall, as measured at said first edge, said cell area being from 0.1 square inch to 1.0 square inch;

B) an acoustic barrier cap comprising a solid polymer film that has been folded to form a planar acoustic barrier portion and a tab portion surrounding said planar acoustic barrier portion, said solid film having a thickness of from 0.003 inch to 0.035 inch, said acoustic barrier cap being located within said cell between said first and second edges to provide an acoustic cavity that has a depth which is less than the depth of said cell, wherein:

a) said planar acoustic barrier portion extends transverse to said upper and lower walls, said planar acoustic barrier portion having a top side located nearest to said first edge, a bottom side located nearest to said second edge, said planar acoustic barrier portion having a boundary comprising an upper right boundary portion, an upper central boundary portion, an upper left boundary portion, a lower right boundary portion, a lower central boundary portion and a lower left boundary portion; and b) said tab portion comprises an upper right tab protruding from said upper right boundary portion, an upper central tab protruding from said upper central boundary portion, an upper left tab protruding from said upper left boundary portion, a lower right tab protruding from said lower right boundary portion, a lower central tab protruding from said lower central boundary portion and a lower left tab protruding from said lower left boundary portion wherein said tab portion provides friction locking of said acoustic barrier cap within said cell, wherein said upper right tab is friction locked to said upper wall at said upper right end portion, said upper central tab is friction locked to said upper wall at said upper central portion and said upper left tab is friction locked to said upper wall at said upper left end portion and wherein said lower right tab is friction locked to said lower wall at said lower right end portion, said lower central tab is friction locked to said lower wall at said lower central portion and said lower left tab is friction locked to said lower wall at said lower left end portion.

2. The acoustic structure precursor according to claim 1 wherein said upper and lower walls form a hexagonal cell.

3. The acoustic structure according to claim 2 wherein the thickness of said solid film is from 0.010 inch to 0.035 inch and wherein each of said upper right tab, said upper central tab, said upper left tab, said lower right tab, said lower central tab and said lower left tab each are split into a first sub-tab portion and a second sub-tab portion.

4. The acoustic structure precursor according to claim 2 where said cell has a cell perimeter defined by said upper wall and said lower wall wherein said upper right end portion and upper left end portion each form a greater portion of said cell perimeter than said upper central portion and wherein said lower right end portion and lower left end portion form a greater portion of said cell perimeter than said lower central portion and wherein said upper right tab and said upper left tab are each larger than said upper central tab and wherein said lower right tab and said lower left tab are each larger than said lower central tab.

5. The acoustic structure precursor according to claim 3 where said cell has a cell perimeter defined by said upper wall and said lower wall wherein said upper right end portion and upper left end portion each form a greater portion of said cell perimeter than said upper central portion and wherein said lower right end portion and lower left end portion form a greater portion of said cell perimeter than said lower central portion and wherein said upper right tab and said upper left tab are each larger than said upper central tab and wherein said lower right tab and said lower left tab are each larger than said lower central tab.

6. The acoustic structure precursor according to claim 1 wherein said upper left tab and lower left tab are separated from each other by a V-shaped notch and wherein said upper right tab and said lower right tab are separated from each other by a V-shaped notch.

7. The acoustic structure precursor according to claim 1 wherein said polymer film is selected from the group consisting of polyether ether ketone film, polyimide film, polyether ketone film and polyphenylene sulfide film.

8. An acoustic structure comprising an acoustic structure precursor according to claim 1 and an adhesive that bonds said tab portion to said upper wall and said lower wall to form said acoustic hard wall.

9. The acoustic structure according to claim 8 which includes a sound permeable sheet attached to the first edge of said honeycomb and a solid sound impermeable sheet attached to the second edge of said honeycomb.

10. A method for making an acoustic structure precursor in which an acoustic barrier cap is friction-locked within a cell of a honeycomb to form an acoustic cavity that attenuates noise generated from a source once said acoustic barrier cap is adhesively bonded within said cell to form an acoustic hard wall, said method comprising the steps of:

A) providing a honeycomb comprising a first edge to be located closest to said source and a second edge, said honeycomb comprising a cell having a left side and a right side, said cell being defined by a lower wall that extends between said first and second edges and an upper wall that also extends between said first and second edges, said lower wall comprising a lower left end portion, a lower right end portion and a lower central portion located between said lower left and lower right end portions, said upper wall comprising an upper left end portion, an upper right end portion and an upper central portion located between said upper left and upper right end portions, wherein a left junction along the left side of said cell is formed where said lower left end portion and said upper left end portion meet, wherein a right junction along the right side of said cell is formed where said lower right end portion and said upper right end portion meet, wherein said cell has a depth defined by the distance between said first and second edges and wherein said cell has a cell size defined by the area surrounded by said upper wall and said lower wall, as measured at said first edge, said cell size being from 0.1 square inch to 1 square inch;

B) providing a solid film that can be folded to form an acoustic barrier cap which comprises a planar acoustic barrier portion and a tab portion surrounding said planar acoustic barrier portion, said solid film having a thickness of from 0.003 inch to 0.035 inch, wherein:

a) said planar acoustic barrier portion has a boundary comprising an upper right boundary portion, an upper central boundary portion, an upper left boundary portion, a lower right boundary portion, a lower central boundary portion and a lower left boundary portion; and b) said tab portion comprises an upper right tab protruding from said upper right boundary portion, an upper central tab protruding from said upper central boundary portion, an upper left tab protruding from said upper left boundary portion, a lower right tab protruding from said lower right boundary portion, a lower central tab protruding from said lower central boundary portion and a lower left tab protruding from said lower left boundary portion; and C) locating said solid film within said cell to form said acoustic barrier cap where said planar acoustic barrier portion extends transverse to said upper and lower walls, said planar acoustic barrier portion having a top side located nearest to said first edge and a bottom side located nearest to said second edge, said acoustic barrier cap being located between said first and second edges to provide an acoustic cavity that has a depth which is less than the depth of said cell, said tab portion providing friction locking of said acoustic barrier cap within said cell, wherein said upper right tab is friction locked to said upper wall at said upper right end portion, said upper central tab is friction locked to said upper wall at said upper central and said upper left tab is friction locked to said upper wall at said upper left end portion and wherein said lower right tab is friction locked to said lower wall at said lower right end portion, said lower central tab is friction locked to said lower wall at said lower central portion and said lower left tab is friction locked to said lower wall at said lower left end portion.

11. The method for making an acoustic structure precursor according to claim 10 wherein said upper and lower walls form a hexagonal cell.

12. The method for making an acoustic structure according to claim 11 wherein the thickness of said solid film is from 0.010 inch to 0.035 inch and wherein each of said upper right tab, said upper central tab, said upper left tab, said lower right tab, said lower central tab and said lower left tab each are split into a first sub-tab portion and a second sub-tab portion.

13. The method for making an acoustic structure precursor according to claim 11 where said cell has a cell perimeter defined by said upper wall and said lower wall wherein said upper right end portion and upper left end portion each form a greater portion of said cell perimeter than said upper central portion, wherein said lower right end portion and lower left end portion form a greater portion of said cell perimeter than said lower central portion, wherein said upper right tab and said upper left tab are each larger than said upper central tab and wherein said lower right tab and said lower left tab are each larger than said lower central tab.

14. The method for making an acoustic structure precursor according to claim 12 where said cell has a cell perimeter defined by said upper wall and said lower wall wherein said upper right end portion and upper left end portion each form a greater portion of said cell perimeter than said upper central portion, wherein said lower right end portion and lower left end portion form a greater portion of said cell perimeter than said lower central portion and wherein said upper right tab and said upper left tab are each larger than said upper central tab and wherein said lower right tab and said lower left tab are each larger than said lower central tab.

15. The method for making an acoustic structure precursor according to claim 10 wherein said polymer film is selected from the group consisting of polyether ether ketone film, polyimide film, polyether ketone film and polyphenylene sulfide film.

16. The method form making an acoustic structure precursor according to claim 10 which includes the additional step of adhesively bonding said tab portion to the upper and lower walls of said cell.

17. A method form making an acoustic structure comprising the steps of providing the acoustic structure precursor according to claim 1 and adhesively bonding said tab portion to the upper and lower walls of said cell.

18. The method for making an acoustic structure according to claim 17 wherein said upper and lower walls form a hexagonal cell.

19. The method for making an acoustic structure according to claim 18 wherein the thickness of said solid film is from 0.010 inch to 0.035 inch and wherein each of said upper right tab, said upper central tab, said upper left tab, said lower right tab, said lower central tab and said lower left tab each are split into a first sub-tab portion and a second sub-tab portion.

20. The method for making an acoustic structure according to claim 17 wherein said polymer film is selected from the group consisting of polyether ether ketone film, polyimide film, polyether ketone film and polyphenylene sulfide film.

* * * * *